C. DENTON.
Wheel-Cultivator.
No. 53,525. Patented Mar. 27, 1866.
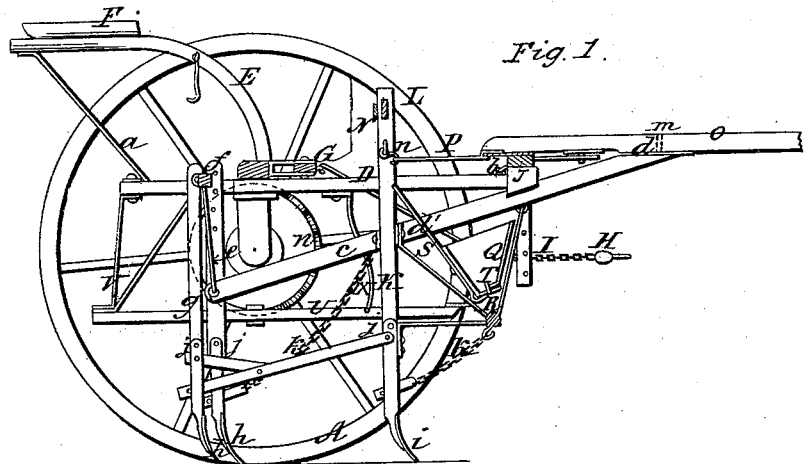
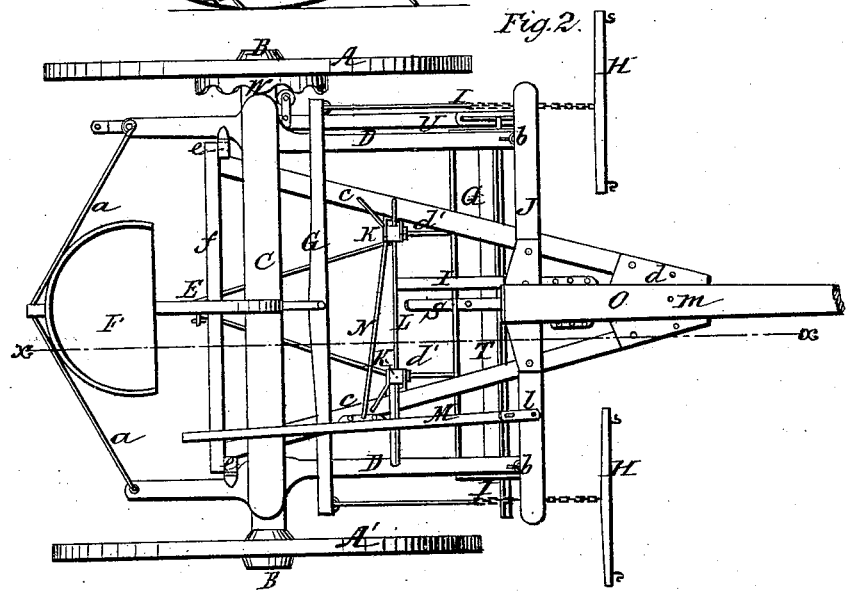

UNITED STATES PATENT OFFICE.

CHARLES DENTON, OF PEKIN, ASSIGNOR TO HIMSELF, SAML. E. BARBER, AND SAML. F. HAWLEY, OF DECATUR, ILLINOIS.

IMPROVEMENT IN CULTIVATOR AND SEEDING-MACHINE.

Specification forming part of Letters Patent No. 53,525, dated March 27, 1866.

*To all whom it may concern:*

Be it known that I, CHARLES DENTON, of Pekin, in the county of Tazewell and State of Illinois, have invented a new and Improved Cultivator and Seeding-Machine; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\,x$, Fig. 2; Fig. 2, a plan or top view of the same; Fig. 3, a detached inverted plan of the seed-hopper.

Similar letters of reference indicate corresponding parts.

The object of this invention is to produce a machine for the cultivation of corn and other crops grown in hills or drills, and also to sow and plow in grain or other seed.

The machine is drawn by a pair of horses, the operator or driver being on a comfortable seat, and controlling with ease the team and the machine in their course. In its construction all useless material and complication of parts have been avoided, consequently the machine is of light draft, extremely simple in construction, and very effective in its operation.

A A' represent two wheels, on which the machine is mounted, the axles B of said wheels being secured to the sides of a frame composed of a bar, C, having two bars, D D, attached to it at right angles, one at each end.

The bar C has a curved stand, E, attached to it, which serves as a support for the driver's seat F, said standard being braced by rods $a$ from the rear of the bars D D. The doubletree G is attached to the front side of the bar C, and the whiffletrees H connected to it by chains and links I.

To the front ends of the bars D D a bar, J, is connected by joints $b$, formed of eyebolts, and this bar J has a frame attached to it, which is of V form, being composed of two oblique bars, $c\,c$, connected at their front ends by a metallic plate, $d$, and having uprights $e\,e$ attached to their back ends, the upper ends of the uprights being connected by a cross-bar, $f$, having a pendant, $g$, attached centrally to it.

The uprights $e\,e$ and pendant $g$ have plows $h$ secured to their lower ends, and to the inner side of each bar $c$ there is attached, by a joint, $d'$, a standard, K, the lower end of which have plows $i$ attached to them. These plows $h\,i$ are attached to their respective standards by pivot-bolts $j$, and the plows, when at work, held in position by chains $k$, as shown clearly in Fig. 1.

The standards K K are connected at their upper ends by a bar, L, which projects through one of said standards sufficiently far to admit of a lever, M, being fitted upon it, the front of which is connected by a joint, $l$, to the bar J. One of these uprights is also connected to the lever M by a rod, N.

It will be seen from the above description that the driver from his seat F may, by manipulating the lever M, move or adjust the standards K, and consequently the plows $i$, in a lateral direction to conform to the sinuosities of the rows of plants, and also raise all the plows out from the ground, when necessary.

When the device is employed for plowing in seed all the plows are used, but when employed as a cultivator the central rear plow is detached, the two front plows, $i$, in the latter case "straddling the row," as it is commonly termed.

O represents the draft-pole, which is secured to the plate $d$ at the front ends of the oblique bars $c\,c$ by a pivot-bolt, $m$. The rear end of the tongue is connected by a link to a lever, P, the rear end of which is connected by a link, $n$, to one of the standards K. By this arrangement it will be seen that the draft-pole will be turned whenever the standards K are moved either to the right or left, and the implement therefore guided to conform to the sinuosities of the rows of plants.

Q represents a seed-box, which is suspended from the under sides of the oblique bars $c\,c$, and has an adjustable slide, R, at its bottom, provided with a pin, $o$, near each end. These pins $o$ are fitted in oblique slots $p$, in plates secured to the under side of the seed-box, and a lever, S, is connected to said slide R, by which said slide may be moved farther forward or backward, as desired, to increase or diminish in width the discharge-opening at the bottom of the seed-box. (See Fig. 3.)

T is a perforated reciprocating slide, which works in the discharge-opening at the bottom of the seed-box, and is connected at one end to a lever, U, the fulcrum of which is at the lower end of a pendant, V, at the rear end of one of the oblique bars c. This lever U is operated by a cam, W, attached to the hub of the wheel A, and a spring, X, which bears against said lever.

I do not claim the seed-box Q, with its adjustable slide R and perforated slide T, operated as shown; but

Having thus described my invention, I claim as new and desire to secure by Letters Patent—

1. The plow-frame consisting of the two oblique bars c c, connected together, as shown, and connected to the bars D D of the main frame by means of the joints b, for the purpose of raising the plows out of the ground when desired.

2. The pivoted draft-pole O, in combination with the pivoted plow-standards K K, arranged substantially as and for the purpose specified.

3. The main frame consisting of the bar C, with slide-bars D D attached, when used in combination with the plow-frame composed of the oblique bars c c, and all arranged substantially as described.

CHARLES DENTON.

Witnesses:
A. P. GRISWOLD,
I. C. CUMMINGS.